(12) United States Patent
Le Paih et al.

(10) Patent No.: US 9,763,458 B2
(45) Date of Patent: Sep. 19, 2017

(54) SAUSAGE PRODUCTION MACHINE COMPRISING A DEVICE FOR THE COAGULATION OF THE SAUSAGE CASING AND PRODUCTION LINE COMPRISING SAID MACHINE

(71) Applicant: MAREL FRANCE, Baud (FR)

(72) Inventors: Jacques Le Paih, Plumeliau (FR); Yohann Pierre, Kervignac (FR); Fabrice Le Pabic, Camors (FR); Leon Spierts, Maastricht (NL); Patricia Hoekstra-Suurs, Berghem (NL); Johannes Kools, Oudenbosch (NL); Johannes Meulendijks, Deurne (NL)

(73) Assignee: MAREL FRANCE, Baud (FR)

( * ) Notice: Subject to any disclaimer, the term of this patent is extended or adjusted under 35 U.S.C. 154(b) by 0 days.

(21) Appl. No.: 14/766,884

(22) PCT Filed: Feb. 7, 2014

(86) PCT No.: PCT/FR2014/050235
§ 371 (c)(1),
(2) Date: Aug. 10, 2015

(87) PCT Pub. No.: WO2014/125194
PCT Pub. Date: Aug. 21, 2014

(65) Prior Publication Data
US 2015/0374002 A1    Dec. 31, 2015

(30) Foreign Application Priority Data

Feb. 15, 2013  (FR) ..................................... 13 51337

(51) Int. Cl.
*A21C 9/06* (2006.01)
*A22C 13/00* (2006.01)
*A22C 11/02* (2006.01)

(52) U.S. Cl.
CPC .......... *A22C 13/0003* (2013.01); *A22C 11/02* (2013.01); *A22C 13/0006* (2013.01); *A22C 2013/0023* (2013.01)

(58) Field of Classification Search
CPC .. C21D 8/0226; C21D 8/0236; C21D 8/0268; A22C 11/02; A22C 13/0003; A22C 13/0006; A22C 2013/0023
(Continued)

(56) References Cited

U.S. PATENT DOCUMENTS 4,001,442 A * 1/1977 Stahlberger ........ A22C 13/0016
106/156.31
5,989,609 A  11/1999 Kobussen et al.
(Continued)

FOREIGN PATENT DOCUMENTS

NL        6909339 A      12/1969

*Primary Examiner* — Quang D Thanh
*Assistant Examiner* — Joseph Iskra
(74) *Attorney, Agent, or Firm* — Zarley Law Firm, P.L.C.

(57) ABSTRACT

A machine including a supply of gelling agent (45), a supply of acidic buffer solution (47), a third supply of food inlet (51) connected to a source of food (53), a mixer (27) connected to the gelling agent and acidic buffer solution supplies, for delivering a mixture of gelling agent and acidic buffer solution, and a co-extruder (31) fed with food (51) and with said mixture, for extruding the food at the center and the mixture at the periphery, so as to obtain the expected food product at the outlet.

17 Claims, 5 Drawing Sheets

(58) Field of Classification Search
USPC ......... 426/92, 105, 140, 277, 531, 573, 574, 426/578, 602, 658; 99/450.7
See application file for complete search history.

(56) References Cited

U.S. PATENT DOCUMENTS

| | | | |
|---|---|---|---|
| 6,054,155 A * | 4/2000 | Kobussen | A22C 13/0016 426/105 |
| 6,153,234 A | 11/2000 | Kobussen et al. | |
| 6,235,328 B1 | 5/2001 | Morgan et al. | |
| 7,337,708 B2 * | 3/2008 | Rothamel | A21C 11/10 99/353 |
| 2005/0238790 A1 * | 10/2005 | Ishimoto | A23G 3/44 426/656 |
| 2008/0317915 A1 | 12/2008 | Hu et al. | |
| 2011/0070338 A1 * | 3/2011 | Carlson | A23L 1/0079 426/105 |

* cited by examiner

FIG_1

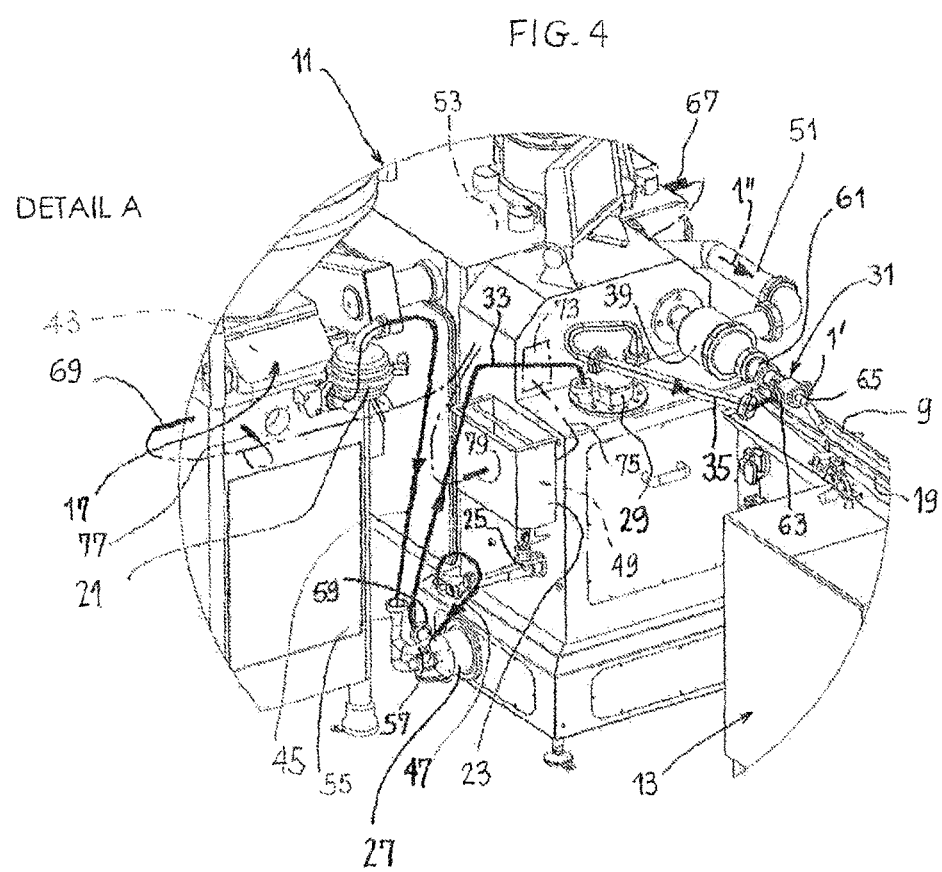
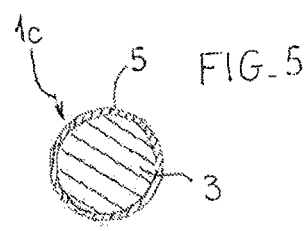

SAUSAGE PRODUCTION MACHINE COMPRISING A DEVICE FOR THE COAGULATION OF THE SAUSAGE CASING AND PRODUCTION LINE COMPRISING SAID MACHINE

BACKGROUND OF THE INVENTION

The invention relates to a machine for feeding a food product to a device for placing the food product in contact with a coagulation product, with a view to coating said product with a hardened material acting as an outer skin also referred to as a "casing", whether the casing is natural or not.

The food products concerned are particularly long, flexible products subject to natural bending. Such products are defined as any product wherein an outer casing is liable to change the shape, subject to the strain exerted by said casing.

In this way, the invention applies to sausages, black or white puddings, and other food products in particles placed in a casing.

A number of these products are prepared by co-extrusion which is a particular form of extrusion.

The principle of food product co-extrusion is described in NL 6909339. A surface of a strip of food paste is coated with a collagen surface coating by co-extrusion. Following extrusion, the coated strip is guided to a coagulation bath to fix the outer casing.

Under the influence of the coagulation solution, the collagen coagulates and/or precipitates. A strip of food paste is thus at least partially coated with a solid outer collagen casing.

In addition to proteins such as collagen, in the food industry, polysaccharides, such as alginate, are also frequently used as a coating agent for foods such as, for example, sausages. The term alginate refers to a group of natural polysaccharides extracted from algae. In the presence of alkaline-earth metals (such as magnesium alginates, calcium alginates), gels may form relatively easily. Collagen and alginate may also be used in combination, as described in WO 2006/135238 A2.

Studies have demonstrated that the gelling of alginates under the effect, for example, of calcium takes place due to the formation of a three-dimensional structure (cf. egg-box model). When the alginate is converted into this three-dimensional structure, a relatively solid gel is created. Such a gel particularly suitable for use as a casing for sausages for example.

In co-extrusion, the casing is frequently extruded on a food in the form of a strip of paste used for manufacturing sausages. Guiding the coated extruded strip in a salt bath containing calcium ensures the setting of the coating which solidifies somewhat. Due to the presence of calcium, the coating agent, for example alginate, gels quickly.

The extruded food may be reinforced further by subsequently adding calcium on the food product.

However, one drawback is that the initial strength/solidity of the alginate gel weakens over time, for example within 24 hours, due to metal chelates (for example, phosphates) present in the food paste dissolving the divalent ion, for example calcium, bound with the gelling agent. The elimination of divalent ions from the gel induces swelling and alteration of the gelling agent. In the worst cases, the gel disappears completely and, consequently, the food is no longer stable and falls apart.

A further drawback of alginate gel is that the gel per se does not actually adhere to the food paste. Consequently, the cooking characteristics of a co-extruded food product, for example a sausage, are such that, during cooking, the gel does not shrink with the food paste and the cooking heat is not distributed by the food. This results in an accumulation of heat in the gel coating, inducing undesirable deformation and discolouration of the coating due to the evaporation of the moisture in the coating. Moreover, air bubbles may form between the food paste and the casing during cooking, giving rise to a less attractive product and/or insufficient cooking, at least locally.

In view of the above, it was deemed necessary to stabilise and increase the strength (resistance/solidity) of the alginate gel applied to the food paste to enhance the shelf-life.

Increasing the number of divalent ions, for example calcium, strontium, barium or combinations thereof, has been envisaged in the prior art. However, a greater number of divalent ions give rise to variations in taste, for example a bitter taste, possibly relatively high salt consumption and equipment corrosion.

Moreover, it is necessary to increase the adherence between the gelling agent and the food paste and also the cooking characteristics of the product.

SUMMARY OF THE INVENTION

Under these conditions, herein, it is proposed to prepare a food product particularly in the form of an elongated strip of paste, via means for treating food particles with a gelling agent, comprising the following treatment steps:
  a) providing food particles,
  b) providing a gelling agent,
  c) treating the gelling agent with an acidic buffer solution, and
  d) placing the food particles in contact with the gelling agent.

More specifically, the proposed machine, suitable for implementing this method, is particularly characterised in that it comprises:
  a first gelling agent inlet connected to a source of gelling agent,
  a second acidic buffer solution inlet connected to a source of acidic buffer solution,
  a third food inlet connected to a source of food,
  a mixer comprising:
    a first inlet connected to the first gelling agent inlet,
    a second inlet connected to the second acidic buffer solution inlet,
    and an outlet for a mixture of acidic buffer solution and gelling agent,
  a co-extruder (or co-extruding head), wherein a first inlet is connected to the third food inlet and a second inlet is connected to the acidic buffer solution and gelling agent mixture outlet, for extruding the food product at the centre and the mixture of acidic buffer solution and gelling agent at the periphery, so as to obtain the expected food product at an outlet of the co-extruder.

This enables the manufacture of food products which are stable over time. Furthermore, due to the acidity of the buffer solution, the gelling agent will adhere to the food product (such as meat) by means of an intermolecular hydrogen bond. Food products manufactured using this solution will have a satisfactory overall texture and, with co-extrusion, a well-structured coating lattice structure and satisfactory casing adherence with the food paste.

In one advantageous embodiment, the third food product inlet feeds the first inlet of the co-extruder with ground food particles, promoting effective co-extrusion with homogeneous coating with the above-mentioned mixture.

Moreover, particularly for optimised quality, it is recommended that:
  the source of gelling agent comprises polysaccharides and/or at least one protein,
  and/or the source of acidic buffer solution has a pH of approximately 3.0 to 6.0,
  and/or the source of acidic buffer solution has a total buffering agent concentration of approximately 50 to 500 mM,
  and/or the source of acidic buffer solution is formulated with a gel or a paste comprising a thickening agent.

The explanations hereinafter elucidate these and other points:

In one preferred embodiment, the selected gelling agent is an alginate, for example sodium alginate. Preferably, the gelling agent is within the range of approximately 1.0 to 8.0% alginate by weight. In addition to the alginate, the coating agent may also comprise hydrocolloids and proteins such as collagen or milk proteins.

Relatively uniform coagulation of the proteins used in the gelling agent may for example be obtained using enzymes. The preferred enzymes are chosen from transglutaminase, lactase, bilirubin oxidase, ascorbic acid oxidase and ceruloplasmin.

The food particles or pieces used may be vegetable, meat, fish fillet particles, etc., and/or may be in the form of a food paste. The food paste may be produced from products of animal and/or plant origin, such as meat, fish, poultry, vegetables, soy protein, milk protein, chicken egg protein.

The gelling agent is suitable for co-extrusion resulting in the production of the outer casing.

The gelling agent may be mixed with food in paste form. The gelling agent preferably comprises polysaccharides, proteins or combinations thereof. The preferred polysaccharides in this case are agar, la gellan, carrageenan, alginates, cellulose, pectin, xanthan and/or carob gum, seed meal or derivatives thereof. It is also possible to use a combination of these constituents and other polysaccharides. It is also possible to use gelling agent proteins, if required in combination with polysaccharides. In particular, the suitable proteins for this purpose are collagen, milk protein and derivatives thereof. However, it is also possible to use combinations of collagen and milk protein.

Furthermore, it is possible to use a gelling agent comprising proteins, such as collagen and polysaccharides, such as alginate.

The acidic buffer solution used as proposed herein would preferably prevent ionic strength differences between the food paste and the gelling agent. It is also recommended that the acidic buffer solution has a pH within the range of approximately 3.0 to 6.0. Preferably, the pH is within the range of approximately 3.1 to 4.5, more preferably the pH of the acidic buffer solution is between approximately 3.2 and 4.0 and even more preferably, the pH of the acidic buffer solution between approximately 3.3 and 3.6.

The term "approximately" as used in the present description is intended to include values, particularly within less than 10% of the values specified, or preferably less than 5% of the values specified.

The acidic buffer solution may consist of a plurality of suitable buffering agents. In one embodiment, the total concentration of buffering agents present in the acidic buffer solution is within the range of approximately 50 to 500 mM, since an insufficient buffering agent concentration would give rise to uncertain buffering liable to deviate, wherein an excessive buffering agent concentration would have an adverse effect on the sought properties of the food product, such as the taste. Preferably, the buffering agent concentration is within the range of approximately 100 to 400 mM. It is even preferable for the buffering agent concentration to be within the range of approximately 200 to 300 mM. Furthermore, it is even preferred for the acidic buffer solution to comprise buffering agents at a total concentration of approximately 250 mM to achieve a satisfactory balance between the taste of the food product and the strength of the buffer.

In a further preferred embodiment, the buffering agents are chosen from citrates and citric acid. Preferably, the citrate is added to the solution in salt form, for example sodium citrate, calcium citrate or combinations thereof. Preferably, calcium citrate is used since calcium has a positive effect on the gelling agent strength. Particularly when calcium citrate is used, further reinforcing steps may be avoided.

In one preferred embodiment, the strip of food product coated with, and/or mixed with, the selected gelling agent is subsequently subjected to at least one reinforcing step e), during which the viscous gelling agent is used with a liquid reinforcing agent. The strip may be used by spraying the liquid reinforcing agent onto the food product or by passing the strip in a bath containing the liquid reinforcing agent. Preferably, the reinforcing agent is added to the viscous gelling agent liquid during or after the gelling agent is placed in contact with the food particles, such as meat particles/pieces. Preferably, the reinforcing agent is added to the viscous gelling agent liquid after the gelling agent has been placed in contact with the food particles.

The reinforcing liquid agent used may comprise saline solutions. More specifically, the saline solution may comprise sodium salt, potassium salt, calcium salt, magnesium salt and/or combinations thereof. Specific salts suitable for use include sodium chloride, potassium chloride, dipotassium phosphate, calcium chloride, calcium lactate, calcium acetate, or calcium phosphate. These salts are recommended since they are already used extensively in food products and because they have a positive effect on the resistance and other properties of the outer casing. In particular, calcium salts, such as calcium chloride, calcium lactate, calcium acetate, calcium phosphate or combinations thereof, have a major effect on the resistance of the gelling agent, particularly if the gelling agent comprises polysaccharides, such as alginate.

In a further embodiment, the liquid reinforcing agent comprises a salt solution wherein the calcium salt concentration is within the range of approximately 0.001 to 15% by weight, preferably within the range of approximately 0.01 to 10% by weight. Particularly satisfactory properties are obtained when the liquid reinforcing agent comprises a saline solution comprising sodium or potassium salts, in addition to calcium. The sodium or potassium salt or the potassium salt concentration of the salt solution should be preferably at least approximately 0.01% by weight. The sodium and/or potassium concentration in the reinforcing agent may be substantially equivalent to the sodium and/or potassium concentration in the food paste. In this way, transport of sodium and/or potassium from the gelling agent to the food paste, or vice-versa, would be avoided.

To continuously provide a stable emulsion of two non-miscible relatively liquid constituents, or if particles incorporated in suspension form need to be separated and dispersed in a viscous phase, it is recommended that, on the above-mentioned feeding machine, the mixer (of gelling agent/acidic buffer solution) comprises a dynamic mixer.

To ensure optimised proportions between the food and the mixture of gelling agent and acidic buffer solution, it is recommended to provide a dosing pump, preferably a lobe pump, situated between the mixer and the co-extruder and thus dosing the proportion between the food and the mixture of gelling agent and acidic buffer solution output from the mixer.

Moreover, the presence of a further (second) mixer, advantageously a static mixer, inserted between the first dosing pump and the co-extruder, to strengthen the mixture of gelling agent and acidic buffer solution recommended.

To promote, during co-extrusion, the distribution of the constituents between the centre and the periphery, it is further recommended to arrange a grinder between the third food inlet and the first inlet of the co-extruder.

Moreover, to regulate, or dose, the proportion between the gelling agent and the acidic buffer solution, the presence of a second dosing pump upstream from the mixer, preferably a corkscrew pump, is recommended.

In one particular embodiment, the feeding machine described herein further comprises measuring means for automatically measuring the electric proprieties and/or the mechanical resistance of the food particles and/or the gelling agent. The differences in ionic strength between the food paste and the gelling agent measured by the measurement means may be analysed by an intelligent control unit, for example a computer running suitable software. So as to reduce the difference in ionic strength between the food paste and the gelling agent and/or to enhance the stability of the gelling agent, the ionic strength of the acidic buffer solution may subsequently be adapted automatically by the intelligent control unit and the gelling agent is subsequently mixed with an automatically adapted acidic buffer solution.

In one alternative embodiment, the feeding machine comprises an intelligent control unit for automatically adjusting the ionic strength of the acidic buffer solution. In the event of the difference in the ionic strength of the food paste and changes to the gelling agent changing during the co-extrusion process, it will be possible to adapt the ionic strength of the acidic buffer solution accordingly, so as to prevent ionic differences from arising in the extrusion process.

In this way, it is recommended that the machine in question comprises:
  an intelligent control unit for automatically adjusting the ionic strength of the acidic buffer solution,
  and/or measuring means for automatically measuring the viscosities of the gelling agent and the acidic buffer solution.

Besides a machine for feeding food product, thus preferably in the form of a longitudinally continuous strip or tube, coated with a gelled and/or coagulated outer casing, the invention also relates to a continuous production line for such elongated flexible food products liable to bend naturally, said line comprising:
  said feeding machine having some or all of the above-mentioned features,
  the, or a, device for placing the food product from the machine in contact with a coagulation solution, to obtain a food product thus coated with a gelled and/or coagulated casing acting as an outer skin, and
  a device for longitudinally portioning the food product coated with this casing.

It is recommended to portion and thus divide the strip in this way into separate portions after step (d) or (e) mentioned above.

This may be carried out with, for example, a cutter passing through the strip at adjustable defined intervals.

Separate strip portions, such as sausages, may thus be obtained.

As mentioned above, due to the use of an acidic buffer solution, the treated viscous gelling agent adheres to the (co)extruded food paste, once placed in contact with a coagulation solution. Consequently, in the event of the strip of food formed being divided into separate portions, the adherence between the viscous gelling agent and the food product (such as meat pieces) situated at the centre of the strip will particularly make it possible to obtain a sausage wherein the viscous gelling agent completely covers the longitudinal ends (unopened ends), thus providing a guarantee of quality (enhanced finish of end products, such as sausages) and preservation over time.

If, following the co-extrusion of the strip of food paste with the gelled and/or coagulated outer casing, if, immediately after step (d) of the method, the strip is divided into a plurality of portions, this division into separate portions is preferably carried out using at least one cutter. After the strip has been divided into separate portions, the portions advantageously undergo at least one reinforcing step and/or a stabilising step.

BRIEF DESCRIPTION OF THE DRAWINGS

Hereinafter, a preferred example of an embodiment is described, with reference to the accompanying figures provided as non-limiting examples, wherein:

FIGS. 2, 3, 4 are views of a machine and a production line according to the solution described herein, FIG. 5 is a sectional view along the section V-V.

Figure 1:
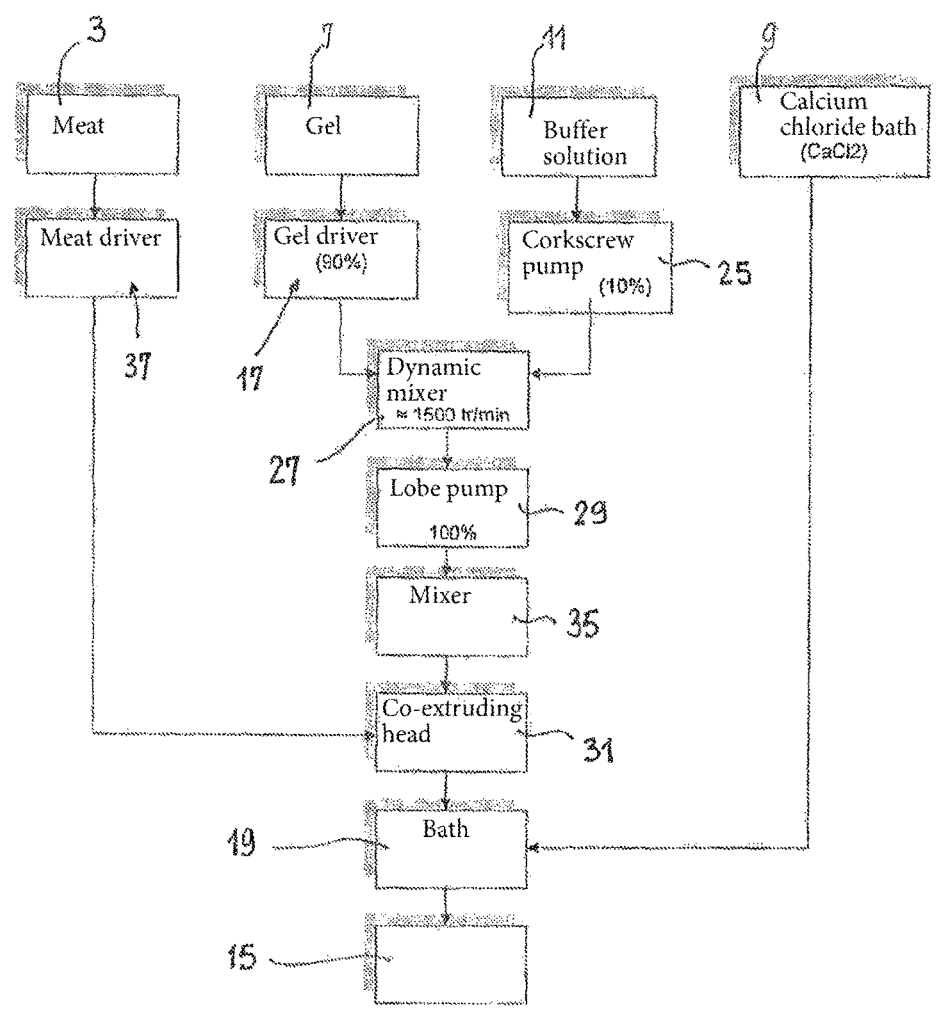
FIG. 1 shows a block diagram of the meat sausage manufacturing method.

In the production or processing method in FIG. 1, the following substances are used, to obtain a final food product 1, such as sausages 1$a$, 1$b$, 1$c$ . . . in this case (see FIGS. 2, 3):

Meat 3: this may comprise or consist of beef, pork, mutton, poultry, lamb, etc. The recipes are varied with a variable percentage of water according to regulations. These food blends may comprise various preservatives and/or antioxidants. In principle, there is no (noteworthy) buffer solution or gel (gelling agent) in the blend. The mixture thereof is contained in the outer casing 5 (FIG. 5).

DETAILED DESCRIPTION OF THE PREFERRED EMOBODIMENTS

The ionic balance of the blend plays a major role in the presence and resistance of the casing 5 with respect to cooking or not. The higher the sodium (Na), or potassium (K) or magnesium (Mg) content of the food product 3 preparation, the greater the rate of gel degradation. For this reason, a possible adjustment is deemed necessary. The presence of an excessively high source of calcium in the blend may thus cause damage during cooking, excess calcium renders the casing 5 too rigid, which gives rise to the appearance of slits in the casing during cooking and a detachment thereof, but not the degradation thereof.

The strength of the casing 5 during cooking is also associated with water retention during cooking. It is possible to use water-retaining ingredients such as fibre or starch in the blend to enhance the strength of the casing during cooking.

The gel (also referred to as gelling agent) 7: in this case, the gel consists of alginate. Alginate consists of two types of monomers (G and M for guluronic acid and mannuronic acid, respectively). These two acids are responsible for the formation of three types of blocks (M, G and M-G blocks). Depending on the marine alga species, the proportion of M and G blocks varies. The quality of alginates can be measured by testing certain parameters such as the viscosity, pH, Brix degree, particle size, texture, microbiology.

The calcium chloride solution 9: this solution (CaCl2) enables the alginate gelling reaction. The concentration of the calcium chloride solution enabling alginate gelling should be measured regularly during production. The gelling of alginates depletes same of calcium ions and an excessive decrease in calcium would weaken the casing 5.

The buffer solution 11: the buffer solution in this case consists of citric acid monohydrate and sodium citrate. These two compounds are in powder form. To produce the solution, it is necessary to dissolve these two powders in water, according to the solubility coefficient of the two compounds.

During tests, a buffer solution at a pH of 3.5 and having a concentration of 250 mM was used. The proportions were as follows:

Citric acid: 39 g/L (kg) of total gel,
Sodium citrate: 20 g/L (kg) of total gel.

One aim in this case is thus that of manufacturing sausages 1a, 1b . . . with a plant-based casing 5 supplemented with an acid contained in the buffer solution, in a mixture.

Due to the acidic conditions of the buffer solution 11 contained in the gel 7, adhesion of the meat to the gel via an intermolecular hydrogen bond is obtained. This feature makes it possible to obtain products which are stable over time, with a satisfactory overall texture and a significant improvement when cooking the products 1, the casing 5 thereof following the shrinkage of the product after cooking.

Figure 2:
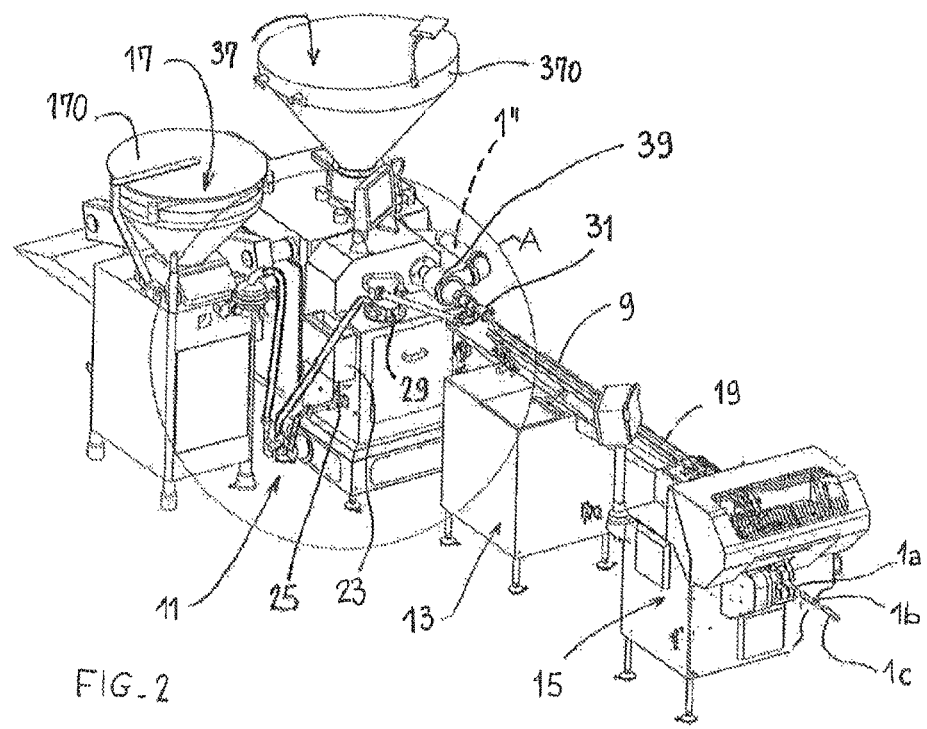
Figure 3:
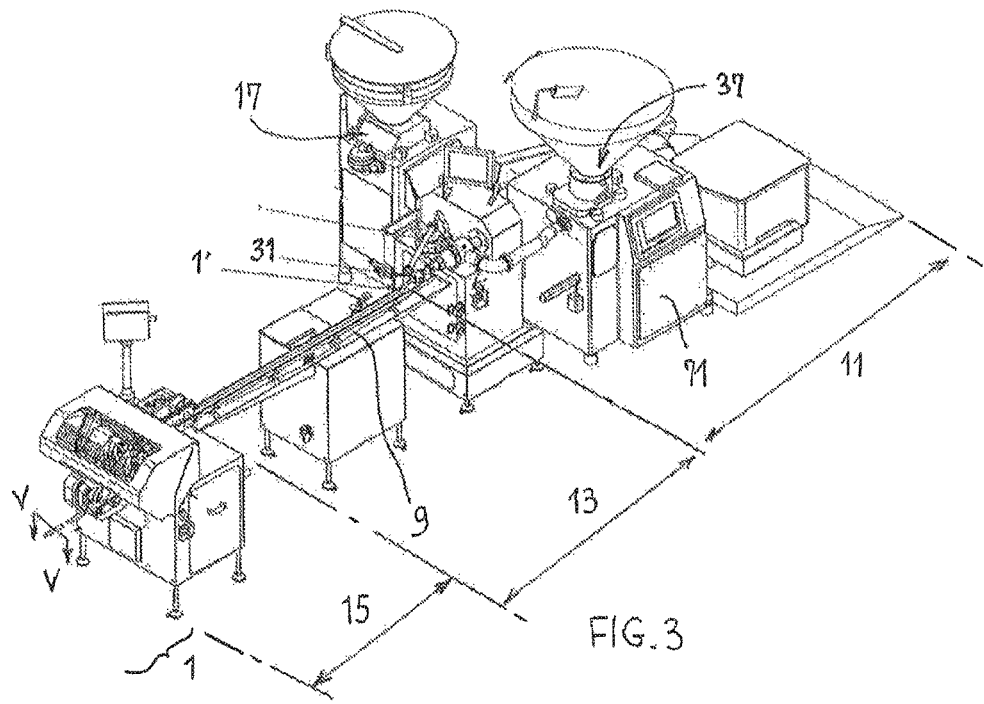

The implementation of the method according to FIG. 1 is as follows, with reference to FIGS. 2-4 thus showing a machine 13 for feeding, with the food product 1' (product 1 with casing 5 which has not yet gelled/set around the blend 3 and in this case not yet portioned in the machine 13), the device or machine 13 for placing the food product in contact with a coagulation product 9, in the coating bath 19.

The alginate-based gel 7 is placed in a driver via the hopper 170; the gel 7 passes through an approximately 150-250 micron filter 21, to expel any air bubbles and retain large particles liable to impair co-extrusion.

The liquid acidic buffer solution 1, stored in an adjacent tank 23, is actuated using a dosing pump 25 (or second pump) dosing or regulating the proportion between the gel 7 and the liquid buffer solution 11; in this respect, an output proportion of approximately 90% gel 7 for 10% liquid buffer solution 11 is envisaged; in this case, the pump 25 is a corkscrew pump.

The two viscous gel/liquid buffer solution products are then mixed, in this case, therefore, downstream from the pump 25, using a mixer 27, which is preferably a dynamic mixer, so as to obtain a homogeneous gel. It is then possible to obtain 100% of the gel mixed with the liquid buffer solution. The whole arrives at a dosing pump 29 (or first pump) situated between the mixer 27 and the co-extruder (or co-extruding head). The dosing pump is suitable for dosing and regulating the proportion between the food product 1" (product 1' before co-extrusion) and the mixture of gelling agent and acidic buffer solution from the mixer 27. In FIG. 4, this mixture circulates in the feed conduit 33. The dosing pump 29 is in this case a lobe pump. It thus regulates the flow rate of the mixture of gel and buffer solution. This mixer then preferably passes through a static mixer 35 to finalise mixing and ensure that it is complete.

The food product 1", in this case a meat blend, stored in the driver 37 via the hopper 370, is conveyed to the grinder 39. This grinder comprises a pre-cutting screen, cutters and a grinder screen of variable diameter according to the desired meat grain. The meat then reaches the co-extruding nozzle 31, with the mixture of gel and buffer solution. The co-extruding nozzle 31 advantageously comprises an expansion tube so as to orient the meat fibres vertically in order to limit the reduction in length after cooking.

The meat and coating gel mixture (gel÷acidic buffer solution) are thus in contact in this co-extruding nozzle 31.

The rule in respect of proportion between the gel mixture and the meat blend is dependent on the applicable regulations in each country. The strip of meat 3 coated with the casing (which has not yet gelled), which may be plant-based, is then placed in contact with the calcium chloride solution 9, in the bath 19, to carry out gelling.

For this purpose, it may advantageously be envisaged to provide an outlet flow of the solution 9 from the co-extruding nozzle 31 and leave the strip of meat 1'/3 immersed in the calcium chloride solution, for a few seconds. The casing acting as a set or fixed outer skin 5 is then formed. The device 13, with the bath 19, thus places the food product from the machine 11 in contact with the coagulation solution 9.

At the outlet of this device 13, the strip of meat coated with the gelled outer skin or casing thereof may then, particularly in the case of sausages, be separated into longitudinal portions 1a, 1b . . . by the portioning device 15.

Figure 6:
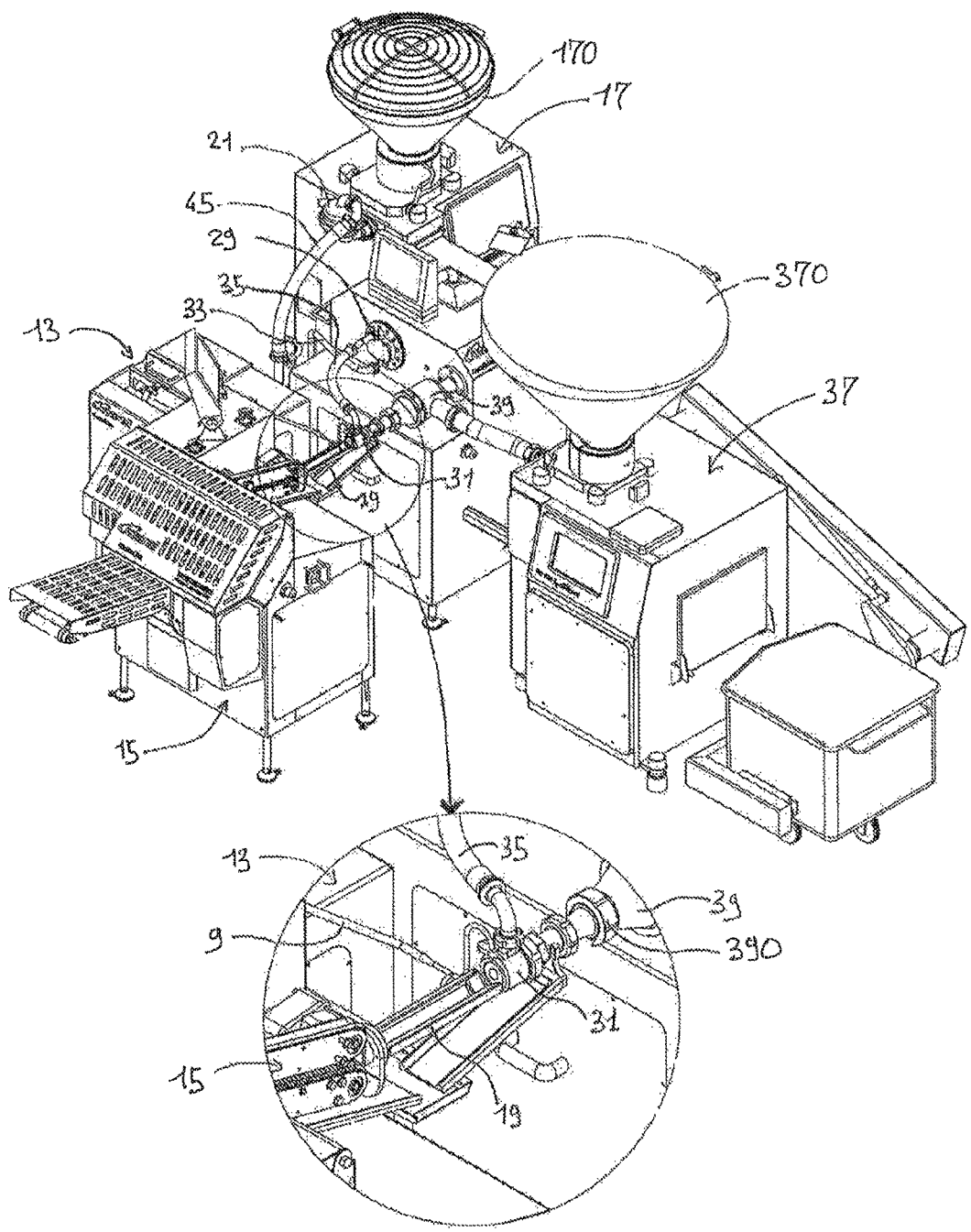
FIGS. 6 and 7 are views of a machine and a manufacturing line according to a variant embodiment of the solution described here.
Figure 7:
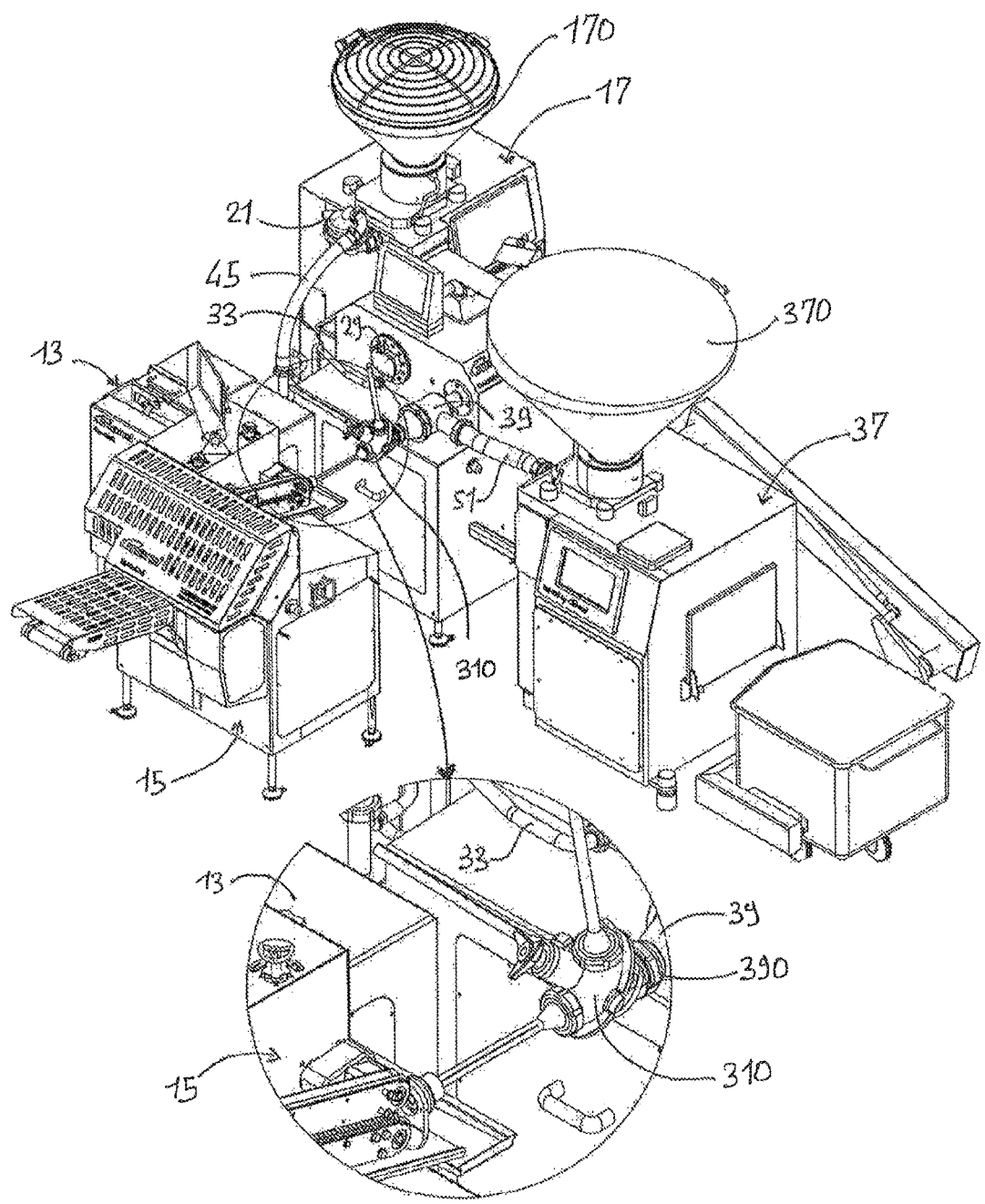

With reference to FIGS. 6 and 7, we shall now describe a variant embodiment of a manufacturing line implementing the invention. The elements that are common with the manufacturing line illustrated in FIGS. 2 to 4 bear the same references. As can be seen in the two FIGS. 6 and 7, the arrangement of the manufacturing line is compact. This is because, when a manufacturing line illustrated in FIGS. 2 to 4 was used, it was discovered that, during the step where the strip of meat 1'/3 is immersed in the calcium chloride solution 9 to form, by gelling, the coating forming the hardened or stiffened skin 5, a very short immersion time in the solution 9 sufficed. Because of this, the bath 19 of the device 13 may have a very short length. This length may be between approximately 10 cm and 30 cm, in particular around twenty centimetres. By way of comparison, in the manufacturing line illustrated in FIGS. 2 and 3, a length of the bath 19 is around 2 m.

The consequence of this short length of the bath 19 is being able to arrange the various machines 11, 13, 15, 17 forming the manufacturing line in a compact manner and thus to save on the surface area occupied by said manufacturing line. It is then possible to have a larger number of manufacturing lines for a given production site.

This compactness of arrangement of the manufacturing line makes it possible to move the portioning device 15 closer to the discharge 390 of the grinder 39. Consequently it is then possible, without modifying this arrangement, to change to the manufacture of a food product by implementing the invention that has just been described (via the arrangement of the manufacturing line illustrated in FIG. 6) to a conventional known manufacture of a similar food product. The change then consists of removing the bath 19 and the co-extruding head 31 mounted on the discharge 390 of the grinder 39 and to mount, instead by switching, a conventional extrusion head 310 as illustrated in FIG. 7. In the case where the food product is a sausage, the conventional extruding head 310 makes it possible to produce pork or mutton casing sausages for example, without modifying the arrangement of the manufacturing line.

Thus a versatile manufacturing line easily adaptable to production demands is obtained. This avoids the establishment of two separate manufacturing lines, one for implementing the invention and illustrated in FIG. 3 and one for implementing a conventional known manufacture.

In the above description, it is clear that the machine 11 thus comprises:
- a first gelling agent inlet 45 connected to a source of gelling agent 43,
- a second acidic buffer solution inlet 47 connected to a source of acidic buffer solution 49,
- a third food inlet 51 connected to a source of food 53,
- a mixer 27 comprising:
  - a first inlet 55 connected to the first gelling agent inlet 45,
  - a second inlet 57 connected to the second acidic buffer solution inlet 47,
  - and an outlet 59 for a mixture of acidic buffer solution and gelling agent,
- a co-extruder or co-extruding head 31 wherein a first inlet 61 is connected to the third food inlet 51 and a second inlet 63 is connected to the acidic buffer solution and gelling agent mixture outlet 59, for extruding the food product at the centre and the mixture of acidic buffer solution and gelling agent at the periphery, so as to obtain said food product at an outlet 65 of the co-extruder.

It should further be noted that the machine 11 advantageously further comprises measuring means 67, 69, for automatically measuring the electric proprieties and/or the mechanical resistance of the food particles and/or the gelling agent, using a processing/computing unit 71.

An intelligent control unit 73 for automatically adjusting the ionic strength of the acidic buffer solution, via the line 75 connected to the tank 23, may also be advantageously envisaged.

The use of measuring means 77, 79 for automatically measuring the viscosities of the gelling agent and the acidic buffer solution is also recommended.

What is claimed:

1. A machine for supplying food product to a device for putting said food product in contact with a coagulation product for coating said food product with a hardened material forming a skin, the machine being characterized in that it comprises:
    a first gelling agent supply connected to a source of gelling agent,
    a second acidic buffer solution supply connected to a source of acidic buffer solution,
    a third food supply connected to a source of food,
    a mixer comprising:
    a first inlet connected to the first gelling agent supply,
    a second inlet connected to the second acidic buffer solution supply, and
    an outlet for mixed acidic buffer solution and gelling agent,
    a co-extruder a first inlet of which is connected to the third food supply and a second inlet of which is connected to the outlet for mixed acidic buffer solution and gelling agent, for extruding the food product at the centre and the mixture of acidic buffer solution and gelling agent at the periphery, so as to obtain said food product at the outlet of the co-extruder,
    a second mixer positioned between a first dosing pump and the co-extruder.

2. The machine according to claim 1, wherein the third food product supply feeds the first inlet of the co-extruder with pieces of ground food.

3. The machine according to claim 1, wherein the gelling agent of the first supply comprises polysaccharides and/or at least one protein.

4. The machine according to claim 1, wherein the acidic buffer solution has a pH of about 3.0 to 6.0, preferably about 3.1 to 4.5.

5. The machine according to claim 1, wherein the acidic buffer solution has a total concentration of gelling agent of about 50 to 500 mM, preferably about 100 to 400 mM.

6. The machine according to claim 1, wherein the acidic buffer solution is formulated as a gel or paste comprising a thickening agent.

7. The machine according to claim 1, wherein the mixer comprises a dynamic mixer.

8. The machine according to claim 1, wherein the first dosing pump regulates the proportion between the food and the mixture of acidic buffer solution and gelling agent.

9. The machine according to claim 1, wherein a grinder is disposed between the third food supply and the first inlet of the co-extruder.

10. The machine according to claim 1, which further comprises a second dosing pump upstream the mixer, for regulating the proportion between the acidic buffer solution and the gelling agent.

11. The machine according to claim 1, which further comprises first measuring means for automatically measuring proprieties of the food and the gelling agent.

12. The machine according to claim 1, which further comprises an intelligent control unit for automatically adjusting an ionic resistance of the acidic buffer solution.

13. The machine according to claim 1, which further comprises a first food pusher and a second gelling agent pusher.

14. The machine according to claim 1, which further comprises measuring means for automatically measuring viscosities of the acidic buffer solution and the gelling agent.

15. A line for the continuous manufacture of long flexible food products able to curve naturally, comprising:
    a machine for supplying food product to a first device for putting said food product in contact with a coagulation product for coating said food product with a hardened material forming a skin, the machine comprising:
    a first gelling agent supply connected to a source of gelling agent,
    a second acidic buffer solution supply connected to a source of acidic buffer solution,
    a third food supply connected to a source of food,
    a mixer comprising:
    a first inlet connected to the first gelling agent supply,
    a second inlet connected to the second acidic buffer solution supply, and
    an outlet for mixed acidic buffer solution and gelling agent,
    a co-extruder a first inlet of which is connected to the third food supply and a second inlet of which is connected to the outlet for mixed acidic buffer solution and gelling agent, for extruding the food product at the centre and the mixture of acidic buffer solution and gelling agent at the periphery, so as to obtain said food product at the outlet of the co-extruder,
    a second mixer positioned between a first dosing pump and the co-extruder, The line further comprising:
the first device for putting the food product issuing from said machine in contact with a coagulation solution, to obtain a food product provided with a coating of hardened material forming a skin, and
a second device for putting in longitudinal portions the food product provided with the coating,
wherein the first device for putting in contact with a coagulation solution comprises a bath having a length between approximately 10 cm and 30 cm.

16. The manufacturing line according to claim 15, wherein the co-extruder is configured to be switched with other extrusion means without modification to an arrangement of the manufacturing line.

17. The machine of claim 14, wherein the measuring means are configured to measure an electrical property and a mechanical strength of the food and of the gelling agent.

* * * * *